United States Patent [19]

Mayer

[11] Patent Number: 5,725,227

[45] Date of Patent: Mar. 10, 1998

[54] SUSPENSION SYSTEM FOR A BICYCLE

[75] Inventor: Steven A. Mayer, Golden, Colo.

[73] Assignee: Schwinn Cycling & Fitness Inc., Boulder, Colo.

[21] Appl. No.: 504,612

[22] Filed: Jul. 20, 1995

[51] Int. Cl.⁶ ................................................. B62K 25/00
[52] U.S. Cl. .............................. 280/284; 280/286; 280/275
[58] Field of Search ................................ 280/283, 284, 280/285, 286, 275

[56] References Cited

U.S. PATENT DOCUMENTS

| | | | |
|---|---|---|---|
| 392,523 | 11/1888 | Owen . | |
| 398,158 | 2/1889 | Jeffery . | |
| 426,670 | 4/1890 | Keating | 280/275 |
| 467,695 | 1/1892 | Warwick | 280/275 |
| 470,317 | 3/1892 | Burton . | |
| 505,753 | 9/1893 | Cocken | 280/275 |
| 1,075,886 | 10/1913 | White . | |
| 1,272,399 | 7/1918 | Douglas | 280/284 |
| 2,863,672 | 12/1958 | Murata | 280/283 |
| 3,301,575 | 1/1967 | Ryan et al. . | |
| 3,982,770 | 9/1976 | Satoh et al. . | |
| 4,378,857 | 4/1983 | Andersson | 280/283 |
| 4,515,236 | 5/1985 | Kanamori | 280/284 |
| 4,765,432 | 8/1988 | Odom . | |
| 4,789,174 | 12/1988 | Lawwill . | |
| 5,037,355 | 8/1991 | Kobayashi | 474/82 |
| 5,326,119 | 7/1994 | Ganoung | 280/275 |
| 5,417,445 | 5/1995 | Smart | 280/283 |
| 5,456,482 | 10/1995 | Rau | 280/283 |
| 5,498,013 | 3/1996 | Hwang | 280/283 |

FOREIGN PATENT DOCUMENTS 7141 of 1899 United Kingdom ................... 280/283

*Primary Examiner*—Brian L. Johnson
*Assistant Examiner*—Gary Savitt
*Attorney, Agent, or Firm*—Jones, Day, Reavis & Pogue

[57] ABSTRACT

A bicycle frame assembly includes a main frame portion having a steering tube at its forward end and a pedal crankset bracket at its rearward end. An intermediate frame portion is pivotably connected to the main frame portion near the steering tube and extends rearwardly therefrom to a seat tube. A rear frame portion includes a pair of upper arm members and a pair of lower arm members connected at distal ends defining a pair of rear wheel drop outs. The upper arm members angle diagonally upwardly and are connected to the intermediate frame portion through a shock absorber. The lower arm members connect through a first link assembly to a main pivot point provided on the main frame portion above and in closely spaced relation to the crankset bracket. The first link assembly extends forwardly and upwardly from the main pivot point and defines another pivot point for connection to a frame member extending downwardly as part of the intermediate frame portion. A second link assembly fixedly attached to the upper ends of the upper arm members pivotably connects at the upper pivot point of the first link assembly and the downwardly directed member of the intermediate frame portion. By the foregoing arrangement, a rear wheel suspension system is provided in which the bicycle has substantial vertical compliance but relatively high lateral stiffness. Also, the frame may, at the same time, be constructed of relatively lightweight tubular members. Further, with the main pivot point aligned proximate the top portion of the drive chain, differential pedal forces as the suspension system is active are minimized.

26 Claims, 3 Drawing Sheets

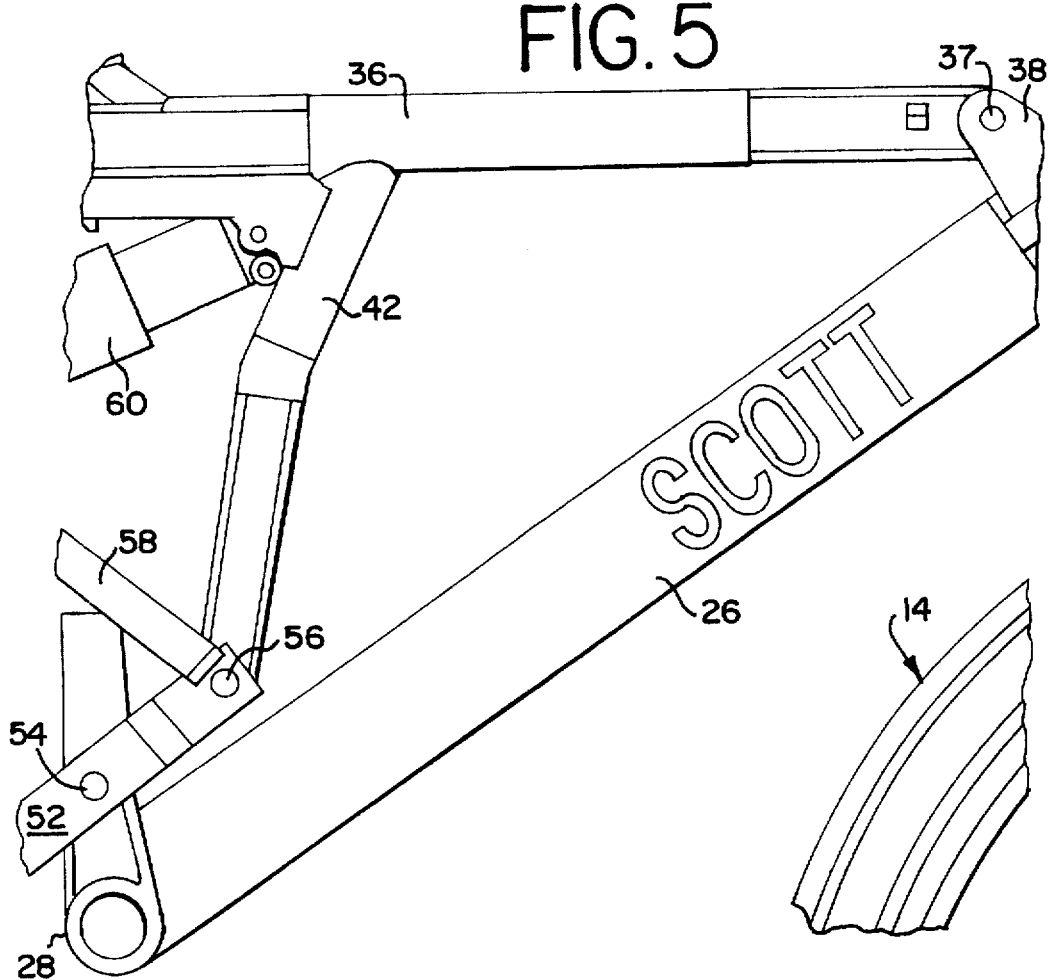

SUSPENSION SYSTEM FOR A BICYCLE

BACKGROUND OF THE INVENTION

1. Field of the Invention

The present invention relates generally to a suspension system for a bicycle and more particularly to a system in which both the rear wheel and the seat of the bicycle are supported on the bicycle frame such that they are resiliently compliant to absorb shock loads from irregular riding surfaces while at the same time providing lateral frame stiffness, thereby minimizing unacceptable performance in the control of the bicycle, the suspension being activated while the rider is sitting and more rigid when the rider is standing, such as when pedaling uphill.

2. Description of the Prior Art

Bicycles have long been known as a desirable means for transportation and recreation. A common bicycle construction includes a basic frame assembly made of suitable tubular members, usually welded together in a relatively rigid configuration. Such a configuration typically includes a steering tube for rotationally supporting a front wheel fork and handlebar assembly. Connected to the steering tube is a down tube extending diagonally rearwardly to a bottom bracket which journals a pedal crankset for rotation. A seat tube extends upwardly from the bottom bracket and is typically connected near its upper end to a top tube which extends rearwardly from the head tube. In order to support the rear wheel of the bicycle, the conventional rigid frame further includes a pair of seat stays extending diagonally downwardly from the upper seat tube and joined at rearward ends to a pair of chain stays extending generally horizontally from the bottom bracket. A pair of dropouts provided at the juncture of the seat stays and chain stays serve to support the axle of the rear wheel.

With the rigid frame assembly of the conventional bicycle, the rider can experience considerable shock while riding over rough terrain, for example. Essentially, the only shock absorbing capability of the conventional bicycle resides in the relatively minor resilience of its tires and possibly in springs associated with the bicycle's seat assembly. Over the years, numerous forms of bicycle frames employing a variety of suspension systems have been proposed and patented. In recent times, mountain bikes have become popular as a recreational means for enjoying bicycle riding often typically characterized by rough terrain. Also, bicycle racing has become popular wherein the race course is established over hilly and rough terrain. Accordingly, it is desirable to provide a bicycle which is so constructed as to be sturdy enough to withstand frequent use in rugged terrain. It is further desirable to provide a sturdy bicycle having shock absorbing capabilities such that the rider can experience a more comfortable ride when passing over rough surfaces.

Many attempts have been made to provide bicycle frame suspension systems which resiliently support the frame relative to both the front and rear wheels. Where rear suspension systems are concerned, these attempts have involved using swing arms and springs, for example, to resiliently suspend the frame relative to the rear wheel. An example of such a suspension system is disclosed in U.S. Pat. No. 3,982,770. However, a disadvantage of known rear wheel suspension systems is that they are often very complex in construction, requiring numerous parts tending to make the bicycle costly to manufacture. A further disadvantage of known systems is that while they may provide enhanced vertical compliance for the bicycle, they often introduce lateral compliance, as well. Such lateral compliance is particularly unacceptable for mountain bikes, for example, because the front and rear wheels are then not rigidly held in a common plane as would allow the rider to maintain a true line of travel, particularly over rough terrain.

Still other prior art rear wheel suspension systems generally are not constructed in such a way as to avoid the problem of the rider experiencing differential pedal forces due to changes in the resultant angular alignment of the drive chain with vertical movement of the rear wheel. Other known systems tend to require oversizing of frame components, making the bicycle quite heavy in overall weight.

Accordingly, it is desirable to provide a bicycle having a rear wheel suspension system wherein the bicycle frame assembly is sturdy and yet lightweight. It is further desirable to provide such a system which is designed such that the frame assembly has vertical compliance but maximum lateral stiffness. Still further, it is desirable to provide such a system wherein the bicycle rider experiences minimal differential pedal forces while the suspension system is in action, thereby permitting the rider to experience more uniform pedaling conditions, regardless if in standing or sitting positions.

SUMMARY OF THE INVENTION

The present invention overcomes the disadvantages of the prior art by providing a bicycle frame assembly comprising a main frame portion having a steering tube at its forward end and a pedal crankset bracket at its rearward end. An intermediate frame portion is pivotably connected to the main frame portion near the steering tube and extends rearwardly therefrom to a seat tube. A rear frame portion includes a pair of upper arm members and a pair of lower arm members connected at distal ends defining a pair of rear wheel drop outs. The upper arm members angle diagonally upwardly and are connected to the intermediate frame portion through a shock absorber. The lower arm members connect through a first link assembly to a main pivot point provided on the main frame portion above and in closely spaced relation to the crankset bracket. The first link assembly extends forwardly and upwardly from the main pivot point and defines another pivot point for connection to a frame member extending downwardly as part of the intermediate frame portion. A second link assembly fixedly attached to the upper ends of the upper arm members pivotably connects at the upper pivot point of the first link assembly and the downwardly directed member of the intermediate frame portion.

By the foregoing arrangement, a rear wheel suspension system is provided in which the bicycle has substantial vertical compliance but relatively high lateral stiffness. Also, the frame may, at the same time, be constructed of relatively lightweight tubular members. Further, with the main pivot point aligned proximate the top portion of the drive chain, differential pedal forces as the suspension system is active are minimized.

BRIEF DESCRIPTION OF THE DRAWINGS

The foregoing and other novel features of the invention will become apparent upon a reading of the following detailed description taken in conjunction with the accompanying drawings wherein:

FIG. 5 is an enlarged schematic view of the pivot areas and ranges of movements of the components illustrated in FIG. 1;

FIG. 5A is a schematic depiction of the range of motion of one of the frame pivot members as depicted within the circled area of FIG. 5; and FIG. 5B is a schematic depiction of the range of other frame components.

DETAILED DESCRIPTION OF THE PREFERRED EMBODIMENT

Figure 1:
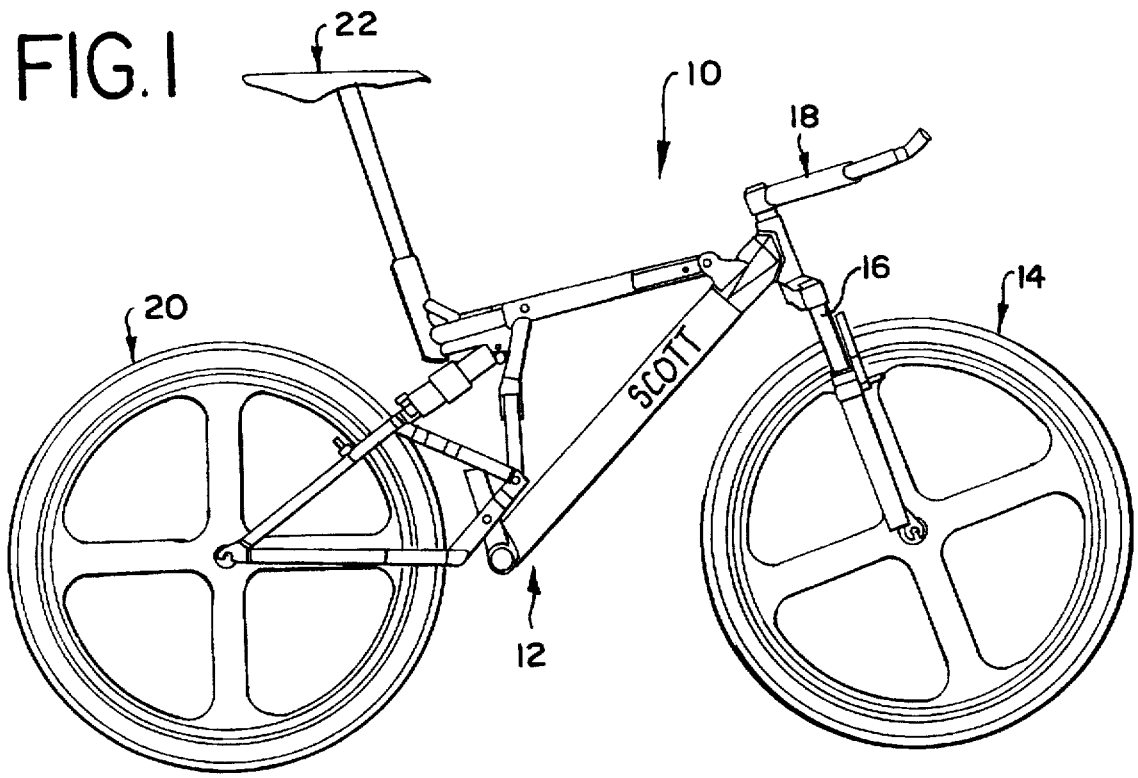
FIG. 1 is a side elevational view of a bicycle having a frame assembly constructed in accordance with the present invention.

Referring now to the drawings, and initially to FIG. 1, a bicycle, designated generally by the reference numeral 10, includes a frame assembly 12 constructed in accordance with the principles of the invention. The frame assembly 12 is supported on a front wheel assembly 14 by a suitable steering fork 16. In a manner well-known in the art, the steering fork 16 is connected to a handlebar set 18. A rear wheel assembly 20 supports the rear of the bicycle 10. A suitable seat assembly 22 provides support for the rider.

Figure 2:
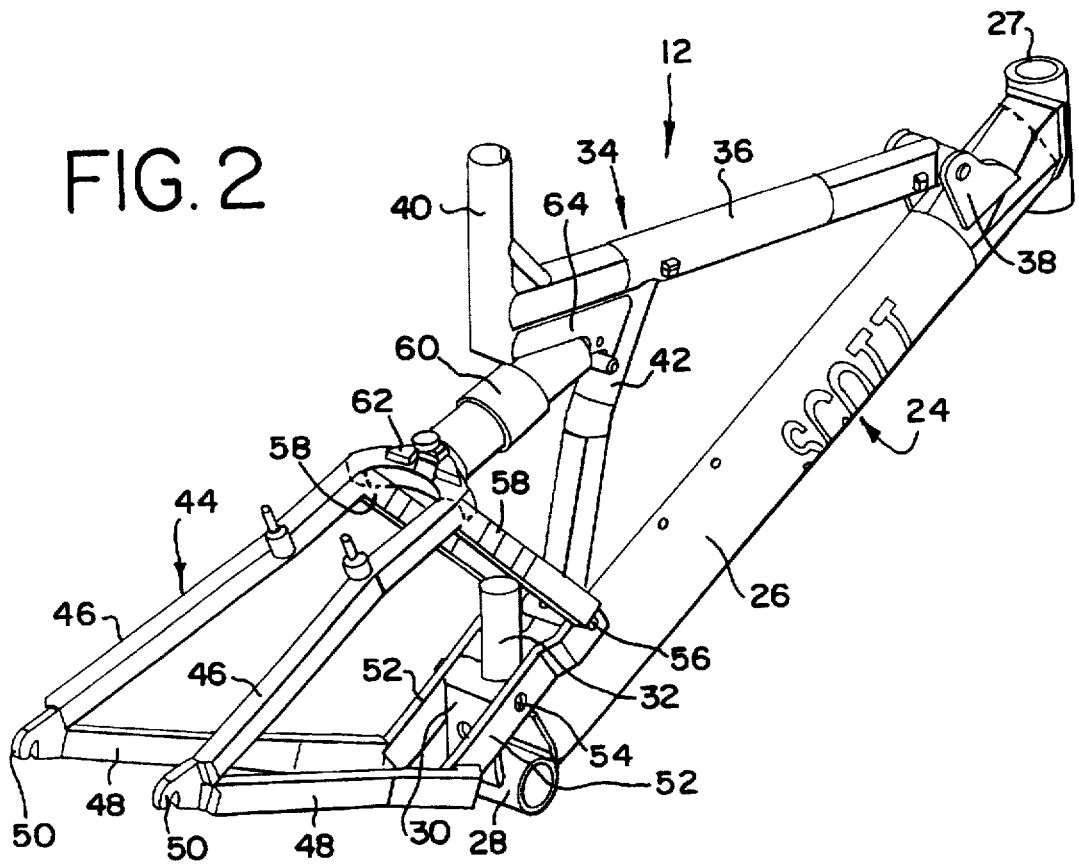
FIG. 2 is a rear perspective view of the frame assembly shown in FIG. 1.
Figure 3:
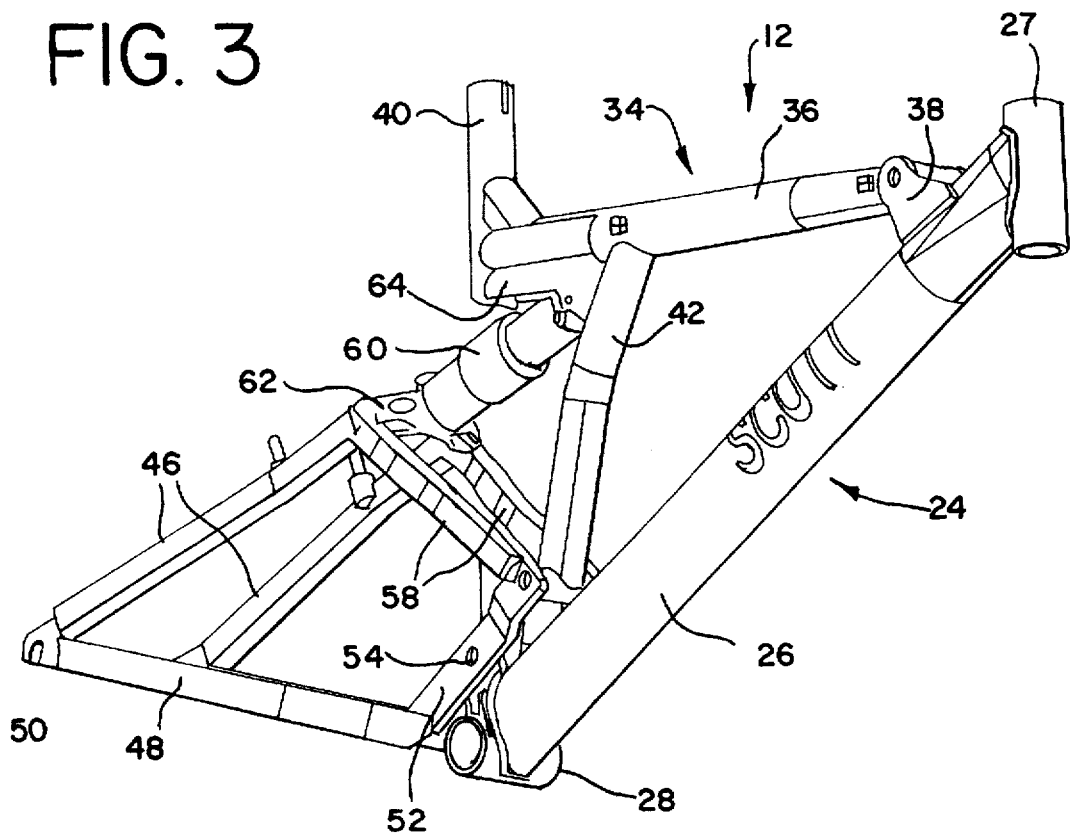
FIG. 3 is a front perspective view of the frame assembly.
Figure 4:
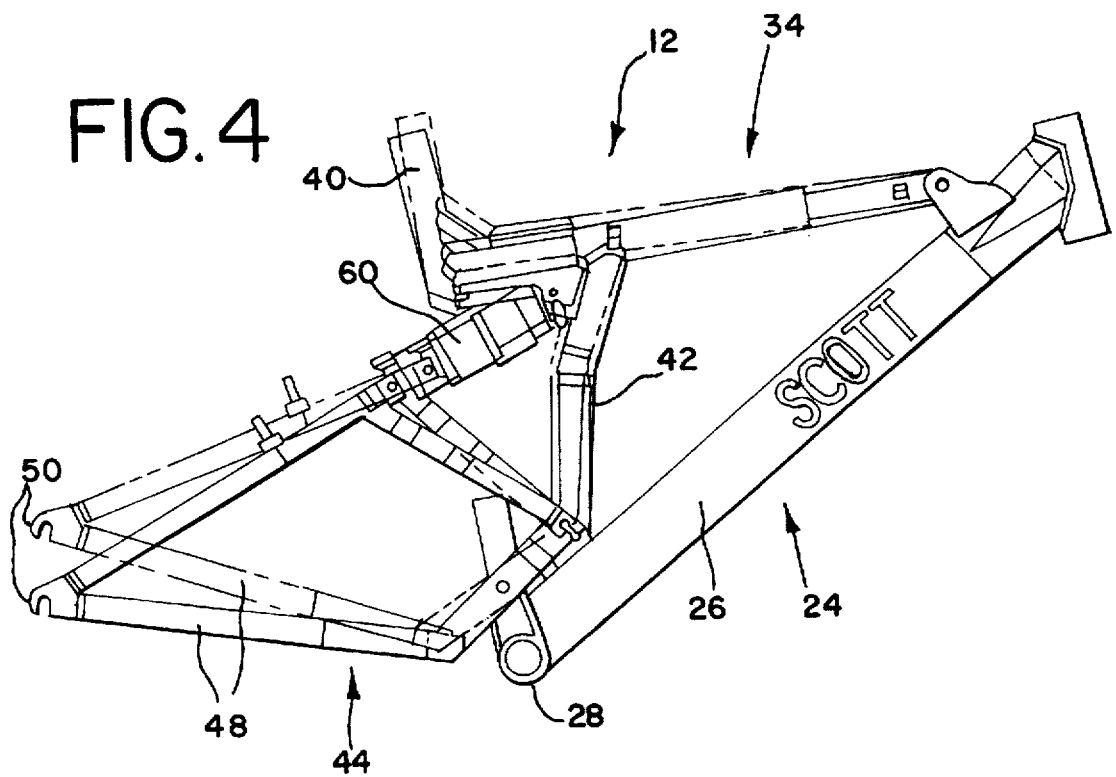
FIG. 4 is a side elevational view of the frame assembly illustrating the ranges of motion of its respective components.

Turning now to FIGS. 2 and 3, the frame assembly 12 is illustrated in perspective as to show the details and relationship of its various components. In the specification which follows, the frame assembly will be described with references to forward and rearward and upward and downward as those terms correspond to the forward and vertical direction and orientation of the bicycle when normally in use. The frame assembly 12 includes as a principal component, a main frame portion, designated generally as 24. Frame portion 24 includes a main down tube 26 having a suitable steering tube 27 fixed as by welding to its forward end. The rearward end of the down tube 26 is provided with a pedal connection crankset bracket 28 which, in a manner well-known in the art, provides for rotational mounting of a pedal crankset and front sprocket assembly (not shown). Extending upwardly from the crankset bracket 28 is a bracket 30 which supports a tube member 32. The tube member 32 may be used for attachment of a suitable front derailleur assembly, also as well-known in the art. The tube member 32 also could be directly affixed to down tube 26.

The frame assembly 12 further includes an intermediate frame portion 34 comprising a top tube 36 which is pivotably connected at its first or forward end to the down tube 26 by a suitable pivot bracket 38, thereby defining a forward pivot point 37. The pivot bracket 38 is preferably disposed in proximity to the steering tube 27. At its opposite rearward end, the top tube 36 is provided with a seat tube 40 for attachment of the seat assembly 22. A tube member 42 extends downwardly from the top tube from a point disposed between the forward and rearward ends of the top tube 36. The tube member 42 preferably is fixedly secured to the top tube 36, and is positioned closer to the seat tube end thereof.

A rear frame portion (or swing arm), designated generally by the reference numeral 44, includes a pair of upper arms 46 and a pair of lower arms 48 which are respectively connected at their rearwardmost ends by parallel drop out brackets 50. The brackets 50 serve in a well known manner to support the rear wheel 20 of the bicycle 10 for rotation. The forward ends of the lower arms 48 are fixedly connected to a first pair of link members 52 which extend diagonally upwardly past bracket 30. A pivot pin 54 extends through the link members 52 and bracket 30 at a point intermediate the ends of the first link members 52, thereby defining a main pivot axis for the rear frame portion 44.

The upper ends of the first link members 52 are connected by a pivot pin 56 to the lower end of tubular member 42 as to define an intermediate pivot point. A second pair of link members 58 extend between the upper ends of the arms 46 (where they are fixedly connected) and the upper ends of the first link members 52 (where they are fixedly connected). A cross brace 62 connects the arms 46 and second link members 58, thus completing the rear frame portion or swing arm 44.

A shock absorber 60 is pivotally connected at one end to cross brace 62 and at its other end, the shock absorber 60 is pivotably connected to a bracket 64 fixed to the top tube 36 at a point beneath and forward of the seat tube 40. Preferably, the shock absorber 60 is of a type having a simple compression spring as to apply a linearly increasing force on the rear frame portion 44 with compression.

Because of the location of the shock 60 and the way it works with the swingarm or rear frame 44, the suspension has a linear rate instead of a regressive rate, as in prior art designs. A linear rate means that the ratio between the shock travel and the rear wheel travel stays the same through the whole suspension stroke. This allows the use of a less expensive coil spring shock instead of an air shock. Air shocks have a progressive rate, which compensates for the regressive rate of other suspension designs. A coil spring as preferably used has a linear rate—the force that it takes to compress the spring is directly proportional to the distance it is compressed. An air shock has a progressive rate—the force that it takes to compress the spring increases exponentially to the distance that it is compressed.

It can now be appreciated that the frame assembly 12 of the present invention provides a very sturdy assembly which may be used in bicycle construction suitable for the roughest of terrain. Because of the geometry of the rear frame portion 44 and the fact that the arms 46 and 48 and link members 52 and 58 may be welded together as a unitary assembly and attached to the main frame portion 24 by a sturdy pivot bracket 28, the frame assembly 12 has substantial resistance to lateral forces tending to twist the frame assembly 12. Accordingly, the bicycle 10 has inherent lateral stiffness to maintain the front and rear wheels 14 and 20 in a proper alignment despite irregular or rough riding surfaces. This is particularly true when the rider is standing and the suspension is effectively locked out. The rider, therefore, has better control of the bicycle 10 when traveling over rough terrain.

It can further be appreciated that with the upper end of the shock absorber 60 disposed forwardly of the seat tube 40, the force of the rear frame portion 44 has a substantial forwardly directed component acting along the longitudinal axis of the top tube 36. Also, because the shock 60 is more in-line with the top tube 36, the stress from the rear wheel 20 flows through the frame better than in prior art designs. This allows the entire frame assembly to be lighter and stronger, and the top tube 36 does not need to be designed as a heavy member to counteract the force of the shock absorber 60 as the rear frame portion 44 is active. In this connection, it will be appreciated that all components of the frame assembly 12 may be formed variously from tubular stock or oval, or the like, and may be of a suitable lightweight metal construction. Thus, the bicycle 10 may have a relatively light overall weight. For purposes of this application, where the word "tube" is used, it will be understood that it is used generically to describe a member whether solid, hollow, metal, synthetic or the like which extends between two locations, except where the context indicates otherwise.

A further important feature of the assembly 12 is that the main pivot axis for the rear frame portion 44, as defined by pivot pin 54, is preferably disposed at a height above the crankset bracket 28 approximately equal to the height of the front drive sprockets. Thus, the top portion of the drive chain will be approximately at the height of the main pivot axis 54, and as the rear frame portion 44 pivots under irregular riding surface conditions, such pivoting action does not tend to impose differential forces on the chain which would be felt by the rider in pedaling.

As best seen in FIGS. 4, 5, 5A and 5B, with the geometry of the frame assembly 12 as illustrated, the drop out brackets 50, and consequently the rear axle of the bicycle 10, will be dimensioned to have a range of vertical movement of on the order of three inches, while the seat tube 40 will have a range of vertical movement of on the order of about ⅔ inch. Thus, the frame assembly 12 offers considerable vertical compliance to provide a comfortable ride over the roughest of riding surfaces. It may also be noted, given the geometry of the assembly 12, that as the rear frame portion 44 pivots, the tubular member 42 will flex slightly. In practice, this flexure is only on the order of a 0.040 inch maximum deflection as measured at the lowermost end of the member 42 (see FIG. 5B). Accordingly, the flexure is well within the capabilities of standard materials used in bicycle frame construction to withstand stress failures with use.

The seat articulates as a fixed beam with a leverage ratio of 2:1. The rear swingarm has a leverage ratio of 2:1. These ratios combine to give the bike a total travel of 4" (3" at the swingarm, 1" at the seat).

Because the swing arm or rear frame 44 is stiffer than the top tube/seat tube assembly, the common pivot 56 follows the main pivot arc. (FIG. 5A.) As noted, the distance between these pivot points changes by 0.040" half way through the arc.

The lower main pivot 54 makes the suspension more "active." This means that the suspension operates independently from chain forces and from braking forces. Because the pivot 54 is closer to the bottom bracket 28, the bottom bracket and the main pivot 54 are in a common extruded piece which also makes it more structurally sound.

The full suspension bicycle disclosed herein is unique because it suspends both the rider and the bicycle. Due to the unique linkage system, the suspension element is marked by two seemingly incongruous reactions to rider positioning. When seated, the suspension is fully activated; making for a plush and comfortable ride, however, the bicycle becomes more rigid when the rider stands out of the saddle. This addresses the shortcomings of current full suspension designs.

When seated, the shock preload is overcome by the rider's weight and the bicycle becomes fully suspended. If a bump is encountered on the trail, the vertical force is immediately absorbed by the suspension. Other suspension bicycles rely on heavy preload to prevent pedal induced bobbing. In order to compress the shock, the force acting on the bike has to be greater than the preload. The preload causes the bike to "jump" before compressing. This is not so with the present invention. The suspension of the present invention is so compliant that even large obstacles seem small.

The active suspension, however, does not mean the bicycle feels like a "slinky" going uphill. The vertical impulses created when the rider is standing actually work with the suspension to help dampen the impulses to provide better traction.

While the present invention has been described in connection with a preferred embodiment thereof, it will be apparent to those skilled in the art that many changes and modifications may be made without departing from the true spirit and scope of the present invention. Accordingly, it is intended by the appended claims to cover all such changes and modifications as come within the true spirit and scope of the invention.

What is claimed is:

1. A frame assembly for a bicycle comprising:

a main frame portion having a forward end and a rearward end, said forward end structured and dimensioned to accommodate a steering fork and said rearward end structured and dimensioned to accommodate a pedal crankset;

an intermediate frame portion including a generally horizontal member having a forward end pivotably connected to said main frame portion and a rearward end structured and dimensioned to support a seat assembly for limited vertical movement relative to said main frame portion;

a rear frame portion including a pair of spaced parallel upper arm members and a pair of spaced parallel lower arm members, said pairs of upper and lower arm members each being connected together in a manner such that means are provided for operative connected to a rear wheel axle;

a shock absorber connecting said upper arm members to said intermediate frame portion;

a pedal crankset connection means, said lower arm members being pivotably connected to said main frame portion about a first pivot axis disposed generally above and in closely spaced relation to said pedal crankset connection means;

said lower arm members pivotably connected to said main frame portion by a first link assembly having a rearward end fixedly connected to said lower arm members and having a forward end spaced from said rearward end, said first pivot axis being disposed intermediate said forward and rearward ends of said first link assembly;

a second pivot axis defined at said forward end of said first link assembly and said intermediate frame portion including a generally vertical member pivotably connected to said first link assembly at said second pivot axis;

said rear frame portion further being connected to said intermediate frame portion, whereby said rear frame portion is pivotably connected to said main frame portion to permit vertical movement of said seat assembly; and said shock absorber constraining relative movement of said seat assembly and rear frame portion when said seat assembly and said rear frame portion move relative to said main frame portion.

2. The frame assembly of claim 1 wherein said generally vertical member extends from said generally horizontal member at a point intermediate said forward and rearward ends of said generally horizontal member.

3. The frame assembly of claim 2 wherein said vertical member is fixedly connected to said horizontal member.

4. The frame assembly of claim 1 wherein said upper arm members are connected to said first link assembly by a second link assembly.

5. The frame assembly of claim 4 wherein said second link assembly is connected to said upper arm members at a forward end of said upper arm members.

6. The frame assembly of claim 1 including means for supporting said seat assembly and wherein said shock absorber is connected to said intermediate frame portion at a point disposed forwardly of said means for supporting said seat assembly.

7. The frame assembly of claim 1 wherein said shock absorber comprises a compression spring assembly.

8. The frame assembly of claim 1 wherein said means for supporting said seat assembly includes a seat tube.

9. The frame assembly of claim 1 wherein said main frame portion includes a down tube member extending generally diagonally downwardly from said means for connection of said steering fork to said means for connection of said pedal crankset.

10. The frame assembly of claim 1 wherein said generally horizontal member is a top tube.

11. The frame assembly of claim 1 wherein said main frame portion includes means for mounting a derailleur assembly disposed proximate said pedal crankset connection means.

12. A frame assembly for a bicycle comprising:

a main frame portion having a forward end and a rearward end, said forward end structured and dimensioned to accommodate a steering fork and said rearward end structured and dimensioned to accommodate a pedal crankset;

an intermediate frame portion including a generally horizontal member having a forward end pivotably connected to said main frame portion and a rearward end structured and dimensioned to support a seat assembly for limited vertical movement relative to said main frame portion;

a rear frame portion including a pair of spaced parallel upper arm members and a pair of spaced parallel lower arm members, said pair of upper and lower arm members each being connected together in a manner such that means are provided for operative connection to a rear wheel axle;

a shock absorber connecting said upper arm members to said intermediate frame portion; and said lower arm members pivotably connected to said main frame portion, whereby said rear frame is pivotally connected to said main frame permitting vertical movement of said seat frame;

said shock absorber constraining relative movement of said seat assembly and said rear frame while minimizing pedal crankset differential forces when said seat and said rear frame move relative to said main frame;

a pedal crankset connection means;

said lower arm members being pivotably connected to said main frame portion about a pivot axis disposed generally above and in closely spaced relation to said pedal crankset connection means;

said lower arm members being connected to said main frame portion by a first link assembly;

said first link assembly having a rearward end fixedly connected to said lower arm members and having a forward end spaced from said rearward end;

said pivot axis being disposed intermediate said forward and rearward ends of said first link assembly;

a second pivot axis being defined at said forward end of said first link assembly; and said intermediate frame portion including a generally vertical member pivotably connected to said first link assembly at said second axis.

13. The frame assembly of claim 12 wherein said shock absorber comprises a compression spring assembly.

14. A frame assembly for a bicycle comprising:

a main frame portion having a forward end and a rearward end, said forward end structured and dimensioned to accommodate a steering fork and said rearward end structured and dimensioned to accommodate a pedal crankset;

an intermediate frame portion including a generally horizontal member having a forward end pivotably connected to said main frame portion and a rearward end structured and dimensioned to support a seat assembly for limited vertical movement relative to said main frame portion;

a rear frame portion including a pair of spaced parallel upper arm members and a pair of spaced parallel lower arm members, said pair of upper and lower arm members each being connected together in a manner such that means are provided for operative connection to a rear wheel axle;

a shock absorber connecting said upper arm members to said intermediate frame portion; and said lower arm members pivotably connected to said main frame portion, whereby said rear frame is pivotally connected to said main frame permitting vertical movement of said seat frame;

said shock absorber constraining relative movement of said seat assembly and said rear frame while minimizing pedal crankset differential forces when said seat and said rear frame move relative to said main frame;

a pedal crankset connection means;

said lower arm members being pivotably connected to said main frame portion about a pivot axis disposed generally above and in closely spaced relation to said pedal crankset connection means;

said lower arm members being connected to said main frame portion by a first link assembly;

said first link assembly having a rearward end fixedly connected to said lower arm members and having a forward end spaced from said rearward end;

said pivot axis being disposed intermediate said forward and rearward ends of said first link assembly;

a second pivot axis being defined at said forward end of said first link assembly; and said intermediate frame portion including a generally vertical member pivotably connected to said first link assembly at said second axis;

said generally vertical member extending from said generally horizontal member at a point intermediate said forward and rearward ends of said generally horizontal member;

said upper arm members being connected to said first link assembly by a second link assembly; and said second link assembly being connected to said upper arm members at a forward end of said upper arm members.

15. The frame assembly of claim 14 wherein said shock absorber comprises a compression spring assembly.

16. A frame assembly for a bicycle comprising:

a main frame portion having a forward end and a rearward end, said forward end structured and dimensioned to accommodate a steering fork and said rearward end structured and dimensioned to accommodate a pedal crankset;

an intermediate frame portion including a generally horizontal member having a forward end pivotably connected to said main frame portion and a rearward end structured and dimensioned to support a seat assembly for limited vertical movement relative to said main frame portion;

a rear frame portion including a pair of spaced parallel upper arm members and a pair of spaced parallel lower arm members, said pair of upper and lower arm members each being connected together in a manner such that means are provided for operative connection to a rear wheel axle;

a shock absorber connecting said upper arm members to said intermediate frame portion; and said lower arm members pivotably connected to said main frame portion, whereby said rear frame is pivotally connected to said main frame permitting vertical movement of said seat frame;

said shock absorber constraining relative movement of said seat assembly and said rear frame while minimizing pedal crankset differential forces when said seat and said rear frame move relative to said main frame;

a pedal crankset connection means;

said lower arm members being pivotably connected to said main frame portion about a pivot axis disposed generally above and in closely spaced relation to said pedal crankset connection means;

said lower arm members being connected to said main frame portion by a first link assembly;

said first link assembly having a rearward end fixedly connected to said lower arm members and having a forward end spaced from said rearward end;

said pivot axis being disposed intermediate said forward and rearward ends of said first link assembly;

a second pivot axis being defined at said forward end of said first link assembly;

said intermediate frame portion including a generally vertical member pivotably connected to said first link assembly at said second axis;

means for supporting said seat assembly; and said shock absorber being connected to said intermediate frame portion at a point disposed forwardly of said means for supporting said seat assembly.

17. The frame assembly of claim 16 wherein said shock absorber comprises a compression spring assembly.

18. A suspension frame assembly for a bicycle comprising:

a main frame portion having a first end and a second end, said first end structured and dimensioned to accommodate a steering fork and said second end structured and dimensioned to accommodate a pedal crankset;

an intermediate frame portion having first and second ends, said first end being pivotable relative to the first end of said main frame portion and said second end structured and dimensioned to support a seat assembly for limited vertical movement relative to said main frame portion;

a rear frame portion including means for operative connection to a rear wheel;

said rear frame portion including upper means pivotably connected to said intermediate frame portion and said rear frame portion further including means pivotably connected to said main frame portion whereby said rear frame portion is pivotably connected to both said main frame portion and said intermediate frame portion and permitting vertical movement of said intermediate frame portion carrying said seat assembly; and shock absorber means connecting said rear frame portion to said intermediate frame portion, said shock absorber means constraining relative movement of said seat assembly and said rear frame portion when said seat assembly and said rear frame portion move relative to said main frame portion;

wherein said intermediate frame portion includes a frame member disposed forwardly of said shock absorber means and pivotably connected to said rear frame portion.

19. The bicycle suspension frame assembly set forth in claim 18 wherein said shock absorber is coupled between said intermediate frame portion and said rear frame portion and said frame portion and said shock absorber means are arranged through their various pivot points to provide a substantially linear rate of compression of said shock absorber means, said shock absorber means being pivotally attached between said intermediate frame portion and said rear frame portion in such a manner as to provide compressible support to said intermediate frame portion without the use of any additional movable connection between said shock absorber means, said intermediate frame portion and said rear frame portion and said main frame portion.

20. The bicycle suspension frame assembly set forth in claim 18 wherein said rear frame portion includes upper and lower arm members, said upper arm members being pivotably connected to said shock absorber means and being substantially aligned longitudinally with the longitudinal axis of said shock absorber means, and said lower arms providing the pivotable connection to said main frame portion.

21. The bicycle suspension frame assembly set forth in claim 18 wherein the pivotable connection of said rear frame portion to said main frame portion is located substantially along or within an arc circumscribed by the radius of a chain sprocket of said crankset.

22. The bicycle suspension frame assembly set forth in claim 18 wherein the pivotable connection of said rear frame portion to said main frame portion is located substantially along or within an arc circumscribed by the radius of a chain sprocket of said crankset and said shock absorber means and said frame portions are arranged through their various pivot points to provide a substantially linear rate of compression of said shock absorber means.

23. A suspension frame assembly for a bicycle comprising:

a main frame portion having a first end and a second end, said first end structured and dimensioned to accommodate a steering fork and said second end structured and dimensioned to accommodate a pedal crankset;

an intermediate frame portion having first and second ends, said first end being pivotable relative to the first end of said main frame portion and said second end structured and dimensioned to support a seat assembly for limited vertical movement relative to said main frame portion;

a rear frame portion including means for operative connection to a rear wheel;

said rear frame portion including means pivotably connecting said rear frame portion to said main frame portion; and shock absorber means connecting said rear frame portion to said intermediate frame portion, said shock absorber means constraining relative movement of said seat assembly and said rear frame portion when said seat assembly and said rear frame portion move relative to said main frame portion;

wherein said intermediate frame portion includes a frame member disposed forwardly of said shock absorber means and pivotably connected to said rear frame portion.

24. The bicycle suspension frame assembly set forth in claim 23 wherein the frame portions and shock absorber means are arranged by their various pivot points to provide a substantially linear rate of compression of said shock absorber means.

25. The bicycle suspension frame assembly set forth in claim 23 wherein the pivotable connection of said rear frame portion to said main frame portion is located substantially along or within an arc circumscribed by the radius of a chain sprocket of said crankset.

26. The bicycle suspension frame assembly set forth in claim 23 wherein the pivotable connection of said rear frame portion to said main frame portion is located substantially along or within an arc circumscribed by the radius of a chain sprocket of said crankset and said shock absorber means and said frame portions are arranged through their various pivot points to provide a substantially linear rate of compression of said shock absorber means.

* * * * *